United States Patent [19]

Peddie et al.

[11] Patent Number: 4,471,232
[45] Date of Patent: Sep. 11, 1984

[54] METHOD OF AND APPARATUS FOR CONTROLLING LOADS ON AN ELECTRICAL POWER SUPPLY

[75] Inventors: Robert A. Peddie, Reigate; John S. Fielden, Ottery St. Mary, both of England

[73] Assignee: South Eastern Electricity Board, England

[21] Appl. No.: 296,928

[22] Filed: Aug. 27, 1981

[30] Foreign Application Priority Data

Sep. 1, 1980 [GB] United Kingdom ................. 8028189

[51] Int. Cl.³ .......................... G06F 15/56; H04B 3/54; H02J 13/00
[52] U.S. Cl. ........................................ 307/35; 307/38; 307/40; 307/86; 340/310 A
[58] Field of Search ................. 307/38, 40, 39, 35, 307/30, 31, 85, 86; 364/483, 492, 493; 340/310 A

[56] References Cited

U.S. PATENT DOCUMENTS

| | | | |
|---|---|---|---|
| 3,489,913 | 1/1970 | Wildi | 307/41 |
| 3,540,030 | 11/1970 | Hartz | 340/310 |
| 4,245,319 | 1/1981 | Hedges | 307/38 X |
| 4,264,960 | 4/1981 | Gurr | 307/40 X |
| 4,349,879 | 9/1982 | Peddie et al. | 307/52 X |
| 4,392,121 | 7/1983 | Gray et al. | 340/310 A |

FOREIGN PATENT DOCUMENTS

| | | |
|---|---|---|
| 2295604 | 7/1976 | France . |
| WO80/01024 | 5/1980 | PCT Int'l Appl. . |
| 2008299 | 5/1979 | United Kingdom . |

*Primary Examiner*—E. A. Goldberg
*Assistant Examiner*—Derek S. Gennings
*Attorney, Agent, or Firm*—Beveridge, De Grandi & Kline

[57] ABSTRACT

To enable a consumer of electrical energy to effect control of total energy consumption by various individual appliances and loads, each individual load has a control unit, conveniently in a plug top, which responds to pulses broadcast on the power supply wiring in the form of short duration interruptions of the waveform. At each appliance a microprocessor unit counts the number of successive pulses in a predetermined time interval and operates an electronic switch if the received count reaches a predetermined number, which may be different for different loads thereby enabling selective control of the loads. Provision is made for automatic restoration of supply if the overall energy consumption falls. Provision can also be made for automatic resumption of supply after a predetermined time interval.

33 Claims, 3 Drawing Figures

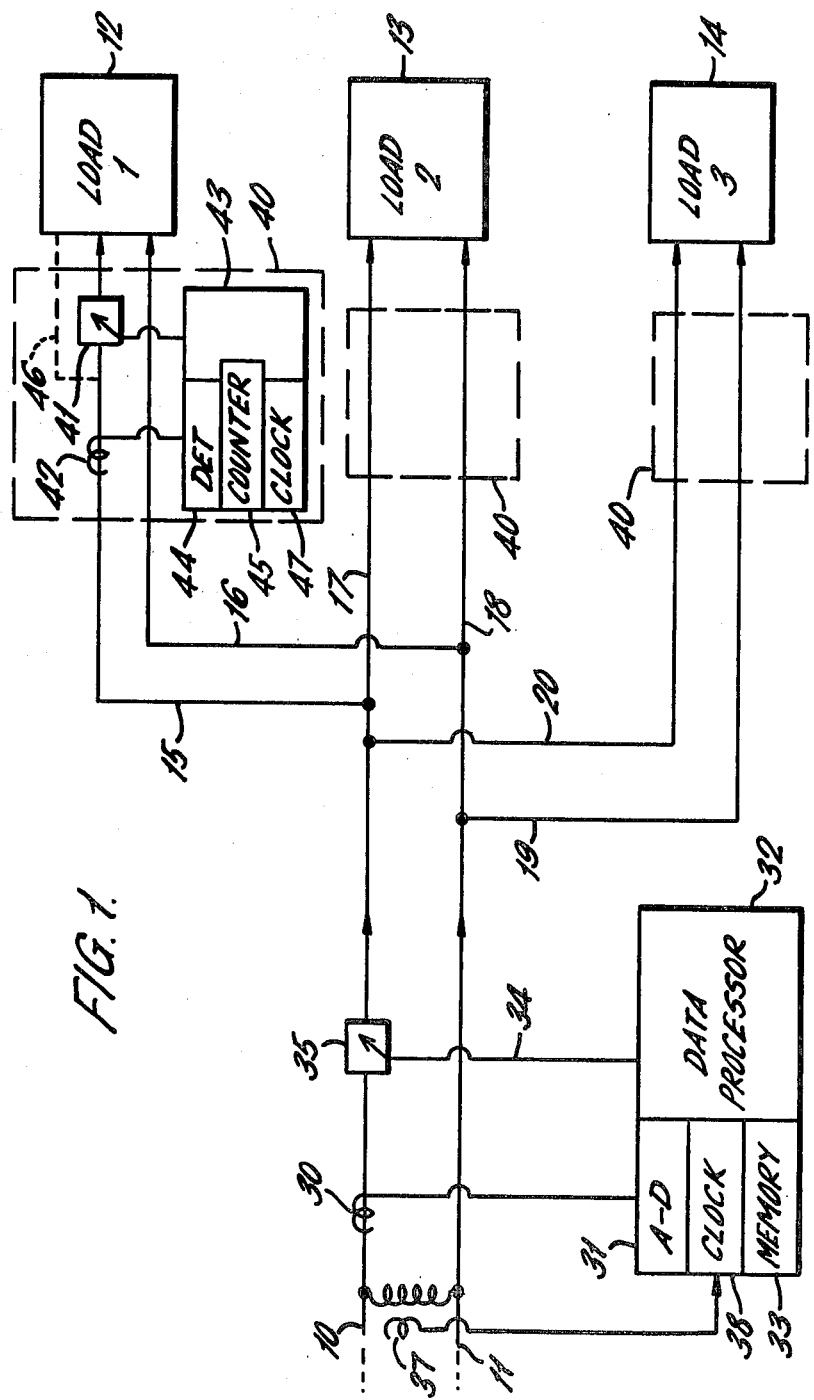

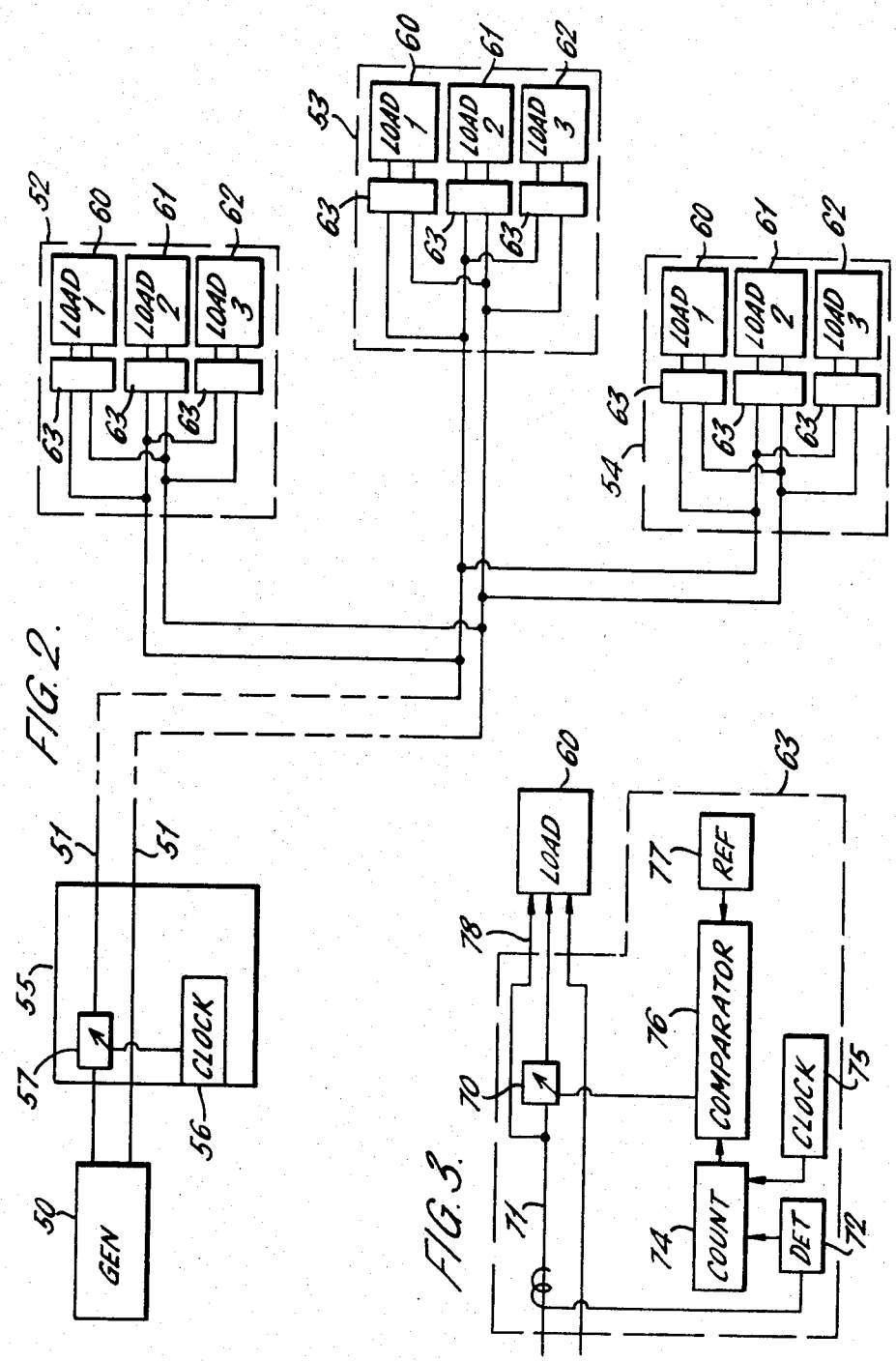

METHOD OF AND APPARATUS FOR CONTROLLING LOADS ON AN ELECTRICAL POWER SUPPLY

BACKGROUND OF THE INVENTION

1. Field of the Invention

This invention relates to methods of and apparatus for controlling loads on an electrical power supply.

2. Prior Art

It is common practice for electric power to be supplied to consumers under a maximum demand tariff. In order to avoid the need for consumers physically checking and disconnecting loads in order to remain within an agreed maximum demand, it is possible, as is described in our U.S. patent application Ser. No. 121,203, filed Feb. 13, 1980 to provide means for automatically disconnecting a load circuit if the maximum demand is exceeded. For many consumers, particularly domestic consumers, it would be preferable to disconnect individual loads rather than to disconnect a complete circuit by switching means located at or near the position where the maximum demand can be monitored.

Techniques are known for the transmission of data between a utility and a consumer's premises by distorting the waveform of the supply at one point in the system and detecting the distorted waveform at a remote point; see for example U.K. Patent Specifications Nos. 1153908, 1168073 and 1341025.

SUMMARY OF THE INVENTION

It is an object of the present invention to provide a method and means enabling individual load circuits to be disconnected in a predetermined priority order yet which avoids the necessity of separate control circuits to each individual load.

As will be apparent from the following description such control of individual loads may be desired by a consumer in order to keep within a predetermined maximum overall demand. It may also be desirable however to enable a utility to effect load shedding by disconnection of individual loads in accordance with a predetermined priority instead of having to disconnect supply circuits with the resultant complete interruption of all the supply to some consumers.

It is convenient to consider in the first place the application of the invention to an alternating supply although, as explained later, the invention may be used with a direct voltage supply.

According to one aspect of the present invention, a method of controlling loads on an alternating electrical power supply comprises the steps of modifying the alternating waveform of the supply to provide detectable controls signals of a plurality of distinguishably different forms, and, at each individual load to be controlled, detecting and selecting received signals of one of the distinguishably different forms and controlling the supply in accordance with the detected and selected signal.

With this method, control signals can be signalled over the supply network but each individual load will only respond to a specific distinguishable signal. There is thus no need for any separate signalling system. The distinguishable signals might, for example, call for differing levels of maximum demand or load. At the consumer's premises, individual appliances would have means for detecting and distinguishing between different signals.

Each of said distinguishably different signals may comprise one or a sequence of similar waveform modifications which are distinguishable by the number of waveform modifications in the sequence, and, at the individual load to be controlled, the signals are distinguished by counting the number of waveform modifications received.

Particularly if the control is to be by the utility, it is convenient to switch each individual load off for a predetermined period (e.g. 15 or 30 minutes) when the count at that load reaches a predetermined number. The means for detecting and selecting the appropriate signal may be reset during or at the end of said predetermined period.

There are a number of advantages in using a sequence of signals with a counting technique in that the count number can be in reverse priority order, i.e. the smallest count is for the load to be switched off first. It will be immediately apparent that broadcast transmission of a sequence of some specific number will result in all appliances having means responsive to that number or to a lower number being switched off. For some loads, frequent switching on and off may be undesirable. In this case, provision may be made, when a load is switched off, for it to remain off for a predetermined period, e.g. 15 minutes. Provision may be made to ensure that a load, after switching on, is not switched off until after a predetermined period.

According to another aspect of the present invention a method of controlling individual loads on an alternating electrical power supply comprises the steps of monitoring the overall demand, modifying the alternating waveform to provide a signal representative of the overall energy supply when that exceeds a predetermined limit, and, at each appliance to be controlled or associated with the individual supply circuit thereto, detecting said signal, incrementing the count on a counter on detection of said signal, decrementing the count on the counter in the absence of a further signal after a predetermined time, and switching off the individual load, or a part thereof, when the count in the counter exceeds a predetermined value. It will be seen that this method of control enables an individual consumer to pre-program his separate loads, e.g. individual appliances, in a predetermined priority order for the purpose of keeping his overall demand within a predetermined limit.

It will be immediately apparent that, by arranging for the various appliances to be switched off at different count numbers, when said predetermined limit is exceeded, the first appliance (that is to say the appliance of lowest priority) can be switched off on receipt of the first signal. If this does not reduce the demand below the required level, the means sensing the total demand will send out a further signal. The counters in the various appliances will then be incremented a second time and the appliance of the second lowest priority will be switched off. Any number of appliances may be controlled in this way by the transmission of successive signals. In general separate individual loads would be allotted different priority numbers although this is not essential for operation of the system. Typically the cycle time for the signals might be of the order of 7.5 sec. When the load is below the maximum demand, the counts would be decremented and thus the various appliances would be brought back into operation in the appropriate priority order.

In order to prevent frequent switching on and off of one appliance with the switching on making the demand above the predetermined level and the switching off reducing it below the predetermined level, it is preferred that the decrementing of the counter should occur only when the overall demand is some predetermined value (which would depend on the loads taken by individual appliances but which might typically be of the order of 3 kW or 6 kW) below said predetermined limit. For this purpose, it is preferred that said signal should be representative of the instantaneous energy consumption and that, at or associated with each individual load, this signal is detected and that the counter is decremented only when the instantaneous energy consumption is less than the predetermined maximum limit by said predetermined value. The signal, for this purpose, conveniently consists of an interruption in the waveform of a duration substantially less than a cycle of the alternating power supply, the duration being a measure of the magnitude information to be transmitted, i.e. the rate of energy consumption. Conveniently this is achieved by switching off the supply, using a solid state switch, immediately before the zero crossing of the voltage waveform (or current waveform) and switching on again a short time later, the duration of the interruption being small compared with the time duration of a cycle at the supply frequency. The maximum duration of the interruption might be of the order of 20° or 30° of phase angle, that is to say 1.0 to 1.7 ms for a 50 Hz supply and slightly shorter for a 60 Hz supply.

It is convenient to measure energy consumption by a current measurement, on the assumption that the voltage will remain constant. In this case the signalling would be used to give a measure of the total current. At each unit, if the count on the counter corresponds to the priority of that unit the unit will be switched off. It will remain switched off until the total current demand by the consumer is less than the maximum by an amount more than the appliance load; the counter will be decremented then and the appliance switched on.

The invention also includes within its scope apparatus for controlling loads on one alternating electrical power supply comprising means, at each individual load to be controlled, for distinguishing one out of a plurality of different signals broadcast over the supply network as distinguishable modifications of the supply waveform and interrupting the supply to the load when a selected signal is received.

According to another aspect of the invention, apparatus for controlling loads on an alternating electrical power supply comprises means, at each individual load to be controlled, for detecting and counting the number of signals received as detectable modifications of the supply waveform and means controlling the supply to the load in accordance with the magnitude of the count.

The means controlling the supply to the load may comprise means comparing the counted number of received signals with a predetermined number and operative to actuate switching means, conveniently a solid state switch, to switch off the supply to the load when the counted number equals said predetermined number.

The means controlling the supply to the load may be operative to interrupt the supply to the load for a predetermined period and to reset the counting means during or at the end of said predetermined period.

Each of said signals preferably comprises a short duration interruption of the alternating current waveform, the duration being small compared with the time duration of one cycle at the supply frequency. Thus said means for detecting the signals in this case comprises means for detecting such short interruptions of the supply waveform. The invention furthermore includes an electrical power supply system comprising means for modifying the alternating waveform of the supply to provide one or more detectable control signals in combination with apparatus as described above for controlling individual loads in response to such signals.

The invention furthermore includes within its scope apparatus for use by a consumer for controlling individual loads on an alternating electrical power supply comprising means for monitoring the overall demand by the consumer, means for modifying the alternating waveform to provide a signal representative of the overall energy supply when that exceeds a predetermined limit, and, at each load to be controlled or associated with the individual supply circuit thereto, data processing means including means for detecting said signal, a counter, means operative to increment the count on said counter when the associated load is taking current, and means operative to decrement the count on the counter in the absence of a further signal after a predetermined time, and switch means operative to switch off the individual load, or a part thereof, when the count in the counter exceeds a predetermined value. As previously explained, different loads of a consumer may be arranged to be switched off at different count numbers.

Furthermore, the invention includes apparatus for use by a consumer for controlling loads on an alternating current power supply to maintain the overall demand by the consumer at or below a predetermined maximum demand comprising means for sensing the overall demand and for determining when said maximum demand is exceeded, means for applying a signal to the various loads by modifying the waveform of the supply when the predetermined maximum demand is exceeded and, associated with or at each individual load to be controlled, means for detecting said signals, a counter with circuit means for incrementing the count each time a signal is received and for decrementing the count in the absence of a signal a predetermined time after the previous signal, switch means operative to interrupt the power supply to the individual load, or part thereof, when the count in the associated counter exceeds a predetermined magnitude, which predetermined magnitudes are different for at least some of the different individual loads and means for closing the switch to restore the supply to said load when the count is below the predetermined number for that load.

The switch means at each controllable individual load may comprise a solid state switch. The counting and switch control may be effected by a simple microprocessor.

The apparatus at a consumer's premises may therefore be small and conveniently, for each item of equipment to be controlled, the necessary apparatus may be arranged in the plug of a plug and socket unit for the power supply to the equipment.

The means for modifying the supply waveform to provide a signal may comprise a solid state switching device to effect an interruption of the supply for a period small compared with the time duration of a cycle of the alternating supply logic means, conveniently embodied in a microprocessor, for controlling the solid state switching device in accordance with the measured demand. It is convenient to utilize the current consumption as a measure of the demand and for this purpose there may be provided a current transformer giving an output signal representative of the total demand current, analogue-to-digital conversion means to convert the current into a digital signal and said logic means may be arranged to compare this with a preset maximum demand magnitude and to operate the switching means in accordance with said comparison.

In some circumstances, it may be desired to provide control by the supply utility of individual loads as well as control by the consumer to limit his maximum demand. For this purpose, the supply utility may have means for signalling by waveform modification and the units associated with the individual loads may be arranged to detect such waveform modifications and to effect the necessary switching using a different waveform modification from that employed by the consumer. The unit can be provided with means for detecting such a signal and for effecting switch operation for a predetermined period, for example 20 minutes, after which the load will be automatically restored. A second set of appliances could be switched off by transmitting a second message for switching off units programmed to detect two successive messages within a predetermined time interval. Similarly further appliances could be switched off with successive further messages. It will be seen that such an arrangement enables a utility to effect load shedding by cutting out the lowest priority loads which loads may be selected by the consumer.

The switching, whether controlled by the utility or the consumer, since it is for individual appliances, can be arranged to leave lights on in any essential equipment. With air-conditioning equipment for example the fans may be left running but heating or cooling plant switched off. Freezers and refrigerators may be switched off but with any necessary lights left operating.

With control by the utility, such an arrangement permits of the lowest priority appliances, for example water heating, to be switched off by the utility with load shedding spread evenly amongst all consumers. It thus gives the utility control over a much bigger proportion of this load and ensures that low priority loads are shed most frequently and the highest most infrequently.

The invention is applicable more generally to any type of power supply, whether alternating or direct voltage. According to another aspect of the invention, therefore, a method of controlling loads on an electrical power supply comprises the steps of modifying the voltage by short duration pulse interruptions to provide detectable control signals of a plurality of distinguishably different forms and at each individual load to be controlled, detecting and selecting received signals of one of the distinguishably different forms and controlling that load in accordance with the detected and selected signal. The distinguishable signals comprise distinguishably different numbers of places within a predetermined time period.

The invention furthermore includes within its scope, apparatus for controlling loads on a electrical power supply comprising the steps of modifying the voltage by short duration pulse interruptions to provide detectable control signals of a plurality of distinguishably different forms and at each individual load to be controlled, detecting and selecting received signals of one of the distinguishably different forms and controlling that load in accordance with the detected and selected signal.

BRIEF DESCRIPTION OF THE DRAWINGS

FIG. 1 is a block diagram illustrating one embodiment of the invention for the control of electrical power consumption by a consumer to limit the maximum demand;

FIG. 2 is a block diagram of another embodiment of the invention to illustrate means for effecting control by the utility; and FIG. 3 is a diagram illustrating in further detail part of the apparatus of FIG. 2.

DESCRIPTION OF THE PREFERRED EMBODIMENTS

Referring to FIG. 1 there is shown diagramatically means for use on a consumer's premises for controlling the load on an alternating electrical power supply to be within a predetermined maximum demand level. In this diagram the incoming mains supply is illustrated as a single-phase supply on leads 10, 11 of which lead 10 is the live line and 11 is neutral. For simplicity in the description only three individual loads 12, 13 and 14 are illustrated. In general a consumer however may have many more loads than this. These loads are energised by two wire supply circuits 15, 16; 17, 18 and 19, 20 respectively.

The overall demand by the consumer is monitored by means of a current transformer 30 on the lead 10 giving an output signal which is fed to an analogue-to-digital converter 31 in a digital data processing unit 32, conveniently a microprocessor. The digital output from the analogue-to-digital converter 31 is compared with a predetermined magnitude set in a memory 33. If the demand, i.e. the signal corresponding to the current in line 10, exceeds the predetermined amount, the unit 32, via a lead 34, sends an operating signal to a solid state switching device, e.g. a triac 35, in the lead 10 to effect a brief interruption of the supply current. This interruption is controlled by means of a clock 38 synchronised with the mains voltage waveform obtained from a voltage transformer 37 so that the interruption starts immediately before a zero crossing of the voltage waveform. The duration of the interruption, in the preferred embodiment, is controlled in accordance with the magnitude of the maximum demand. The interruption has a total duration not exceeding about 20° or 30° of phase angle, that is to say between 1.0 and 1.7 m.secs for a 50 Hz supply and slightly less for a 60 Hz supply. This interruption thus constitutes a signalling waveform. The clock 38 controls the cyclic operation of the system and the comparison of the digitized value representing the demand with the preset stored value representing the predetermined maximum demand is, in this particular embodiment, effected once every 7½ seconds, that is to say every 375 cycles for a 50 Hz supply. It is possible to sample the current much more frequently than this and, by digital data processing in the unit 32, to determine an averaged demand over this period, thereby eliminating the effects of any transients. The comparison is made and the signal is sent out at the end of the 7.5 second period. A signal is transmitted only if the measured demand is above the comparison level.

At each load, there is unit 40, referred to hereinafter as the priority interrupt device, which serves to detect the signals on the waveform and to give appropriate control to the supply to the load. As is shown for the load 12, the unit 40 includes a solid state switch 41, e.g. a triac, a current transformer 42 responsive to the current in the supply lead 15 to the load and a data processing unit 43 consisting essentially of a small microprocessor. This data processing unit includes a detector 44 detecting the short duration interruption signal effected by the switch 35. There is also a counter 45 which is incremented by each successive detected signal. When the count exceeds a predetermined number in a memory in the data processing unit 43, the counter 45 operates the switch 41 to interrupt the supply to the load 12. In some circumstances, the switch 41 may be bypassed by a lead, shown in dashed lines at 46 which ensures that power is fed to part of the load even when the switch 41 is opened. The lead 46 may for example serve to provide lighting for a refrigerator or freezer or to provide power for a fan in an air-conditioning unit whereas the switch 41 interrupts the supply to the main power consuming parts of the loas for example heating and cooling means in an air-conditioning unit. The supply remains interrupted until the counter is decremented, in a manner to be described hereinafter, so that the count is taken below the aforementioned predetermined number. The different units 40 will have different numbers, the lowest number being associated with the load of lowest priority and the successive further numbers with the loads of more important priority.

The operation of the above-described system is as follows: when the demand detected by the current transformer 30 (and determined after averaging over a period of at least a few cycles and possibly up to 7.5 seconds) exceeds the predetermined level, the unit 32 operates the switch 35 to send out a signal consisting of a brief interruption of an alternating current waveform. On the first such signal, all the units 40 will start their counters 45. Thus each counter will, on the first signal count one. The count is compared with the preset parameters. The unit 40 associated with the load of lowest priority would switch off this load on receipt of this first signal. None of the other loads would be switched off. 7½ seconds later, if the load is still over the maximum demand, the switch 35 will be operated again to send a further signal. All the counters 45 will detect this signal and will increment by a further unit step and hence the unit 40 of the next higher priority will cause associated loads to be switched off.

In the simplest arrangement, if the total load sensed by the current transformer 30 is below the maximum, no signal would be sent. If no signal is received after 7½ seconds, a clock 47 in each of the units 40 would decrement the counters by one unit. If the count was two and was decremented to one, then the load associated with the unit of second lowest priority would then be switched on. It is desirable however to avoid repetitive switching on and off of one load if the demand is caused to rise and fall below the predetermined level by swiching of a single load. In the embodiment described, the signal effected by the switch 35 is an interruption of the duration dependent on the measured current. The units 40 are arranged so that, if the signal indicates that the total load is below the maximum by a small amount (e.g. less than 3 kW or less than 6 kW depending on the magnitude of individual loads), the switch 35 is operated to send a signal but this signal is detected by the aforementioned detectors 44 in the various units and, because it is of a duration corresponding to a load below the maximum, the units 40 leave their counters unchanged. If the total load sensed by the current transformer 30 is below the predetermined maximum demand by an appropriate amount, e.g. 3 kW or 6 kW, the unit 32 does not send any signal. The absence of a signal at each of the units 40 causes the counters 45 to be decremented. This decrementing is thus effected under clock control, if no signal is received after 7½ seconds from the previous signal. Decrementing of the counters 45 will, in general, cause one of the loads to be restored because the count for the unit 40 associated with that load is now below the priority number of the load. It will be readily apparent that the units 40 may be arranged to switch on any load if the measured demand is less than the predetermined maximum demand by a particular amount determined by the expected load of that appliance. For this purpose in the various units, the pulse length will be measured in order to obtain information about the magnitude of the sensed demand.

It will be seen that, in each of the units 40, the count will be incremented and decremented as appropriate. The units will also determine the current level for the whole of the maximum demand circuit and will determine the action to be taken. If the count corresponds to the priority of that unit and if the current is over the predetermined maximum, the unit will remain switched off. If the current is just under the predetermined maximum, the unit will remain switched off. If the current is under the maximum by the appropriate amount, typically 3 kW or 6 kW (the amount chosen in accordance with the appliance load) then the counter for this unit (and the counters for all the other units) will be decremented and the load will be switched on. If the current for the overall supply is over the maximum, the counter will be incremented; the associated load will remain switched on unless this increment takes the count up to the priority number for the unit. If the current is under the maximum, the load will remain switched on. The counter will remain unchanged if the current is just under the maximum but will be decremented if the current is under the maximum demand by more than the aforementioned predetermined amount.

Physically the units 40 can be made quite small. Conveniently such a unit may be incorporated in a plug top of a plug for connecting an individual load to a power supply socket.

In some cases, for example where load-controlling units 40 are not provided for all the loads, provision may be made for switching off the overall supply, using the switch 35, if more than a predetermined number of counts (e.g. 8 counts if there are fewer than 8 controlled loads) are accumulated. For this purpose, the unit 32 may include a counter, similar to the counters 45, which is incremented and decremented like the counters 45 but which serves to switch off the supply when the 8 counts have accumulated. It would be necessary then to provide reset means but their nature will depend on the circumstances. It would be possible for example to provide for periodic short duration restoration of the supply and testing of the magnitude of the demand or to provide for manual reset or to provide for automatic restoration after a predetermined period, e.g. 15 or 30 minutes.

The current transformer 30, switch 35 and data processing unit 32 may form part of a metering and load management control system such as is described in co-pending U.S. patent applications Ser. Nos. 122,166 filed on Feb. 19, 1980, and 121,203 filed on Feb. 13, 1980.

The control arrangement illustrated in FIG. 1 enables a consumer to effect automatic switching off, and subsequent switching on again, of individual loads to keep his demand within a predetermined level. This control is effected however without any need for separate control leads to the various units. The various individual loads may be connected for example on a ring main but still be separately controlled in accordance with the overall demand. The control units 40 are associated with the various loads and conveniently are located on or near their associated loads. In some cases however, for example where the individual loads are separately fused with the fuses grouped in a fuse box, it may be more convenient to group the units 40 for example at the fuse box.

In some cases it may be preferred to effect the restoration of supply to an individual load at a predetermined time interval, e.g. 15 minutes, after the supply has been switched off. This control may be effected by the clock in the unit 40. If supply is restored to a load, it may be desired to prevent interruption of supply to that load for a predetermined period, e.g. one hour. This may also be effected by the clock which is arranged to inhibit switching for the required period.

In FIG. 2 there is illustrated schematically an arrangement enabling a utility to switch off individual loads on a consumer's premises, the individual loads being selected in accordance with a priority which is predetermined. The arrangement, like that of FIG. 1, does not require separate control leads to the individual appliances.

Referring to FIG. 2 there is shown diagrammatically a utility with electric power generating means 50 providing power on a supply circuit 51 (shown diagrammatically as a two-wire circuit) feeding a number of consumers of which three are shown respectively at 52, 53 and 54. The utility has means 55 for signalling by modifying the waveform of the supplied power. These means 55 might be located near the generator 50 but may be at any other convenient location between the generator and the consumers whose appliances are to be controlled by the signalling means 55.

The means 55 consists essentially of signalling means controlled by a clock 56 synchronised with the main supply waveform, which clock controls means 57 operative to effect signalling by short duration modification of the waveform. This modification conveniently is an interruption starting just before the waveform passes through the zero potential level and ending just after that point. The signalling is initiated automatically and provides a control for effecting, in a manner to be described later, interruption of the supply to selected loads on a consumer's premises for a predetermined time period.

Each of the consumers has a plurality of loads of which three are shown at 60, 61, 62. Each load has a priority interrupt device 63 and one such device 63 is illustrated in further detail in FIG. 3.

Referring to FIG. 3, there is shown one of the loads 60 with the associated priority interrupt device 63. This device 63 includes a solid state switch 70, typically a triac, for interrupting the power supply which is fed to the load via a supply conductor 71. The device 63 moreover contains a detector 72 responsive to the signalling waveform produced by the aforementioned unit 55 this waveform being picked up by a current monitoring device 73 e.g. a resistor or current transformer coupled to the supply lead 71. The detected signal from the detector 72 is applied to a counter 74. The unit 63 furthermore includes a clock 75, the function of which clock will be explained later. The count in the counter 74 is compared in a comparator 76 with a reference number in a store 77, which reference number is representative of an allocated priority for the associated load 60. When the count reaches the reference number in the store 77, a control signal is produced by the comparator 76 which operates the aforementioned switch 70 to switch off the supply to the load 60 for a predetermined time for example 15 or 30 minutes, this time being controlled by the clock 75 which is triggered by the control signal and which is operative to restore the supply after the predeterined time.

Appliances of the lowest priority conveniently are provided with devices 63 having unity set in the reference store 77 so that the associated load is switched off as soon as a signal on the supply lead is detected. The appliances would then remain switched off for the predetermined time. Appliances of next higher priority would have a higher reference number, for example 2, put in the store so that they would only be switched off on receipt of two detected signals.

It will be immediately apparent that, by such an arrangement, some or all of the appliances on a consumer's premises may be directly controlled by the utility to be switched off in the event of excessive demand on the power supply. The devices would be switched with those of lowest priority first. Transmission of a single signal from the signalling means 55 can thus effect load shedding over a whole supply network with only the lowest priority loads being disconnected. Typically, if this did not produce sufficient reduction in demand, a second signal would then be transmitted so as to switch of devices of the next higher priority and so on. A utility can thus, in an emergency when load shedding is necessary, effect a controlled reduction in demand without cutting off completely the supply to any consumer. Apparatus which has to be kept in operation, for example for safety reasons, can be left connected to the supply. In any individual appliance or load, part of the load might be fed by a separate lead 78 (FIG. 3) which bypasses the switch 70 so that, for example safety lights may be left in operation. In air-conditioning equipment, the heating or cooling load could be controlled by the switch 70 whilst leaving the fans still in operation.

Any load which is switched off would be automatically switched on again after the aforementioned predetermined time. Such loads however could be removed again by a further signal on the supply lines from the signalling means 55. The switching on of the loads is conveniently effected by utilizing the clock 75 to reset the counter 74 to zero so that the counter is then ready to respond to further detected signals.

It will be seen that, from the point of view of the consumer, when load-shedding is required, he would lose only certain loads and can keep a supply to the more essential loads. From the point of view of the utility, such an arrangement enables any load-shedding to be spread evenly over all or substantially all consumers. A much bigger controllable load is available than with conventional techniques of complete disconnection of specific circuits. The utility has control over a large percentage of its domestic load whilst ensuring always that low priority loads are shed the most frequently and the highest most infrequently. All consumers can be treated equally at all times. Ir will be noted that there is no need to have any special wiring as each appliance can have its separate unit 63. Physically this is a very small unit which could for example be incorporated in a special plug for connecting the load to a supply socket.

The arrangement of FIGS. 2 and 3, providing for utility control, may be combined with consumer-controlled arrangement of FIG. 1. Many component parts of the individual load control units are similar and could be common to a combined system. If the count decrement is to be made in the manner described with reference to FIG. 1, then distinctive signals, with separate counters, may be employed for utility control and consumer control.

We claim:

1. A method of controlling loads within the premises of consumers on an alternating electrical power supply system in accordance with the demand of those loads comprising the steps of monitoring the demand of the system for electrical power, in response to detection of power demand by the system in excess of a preset amount opening the supply circuit for a short duration less than one cycle of the supply frequency and so modifying the alternating waveform of the supply to provide detectable and distinguishable control signals, and at each individual load to be controlled, detecting the control signals, selecting from the detected control signals at least one control signal and controlling the supply to such individual load in response to the selected signal.

2. A method as claimed in claim 1 wherein each of said control signals comprises one or a sequence of similar waveform modifications of the alternating waveform which are distinguishable by the number of waveform modifications in the sequence and wherein, at each individual load to be controlled, the signals are selected in response to counting of the number of waveform modifications received.

3. A method as claimed in claim 2 wherein at each individual load the supply is controlled by switching the supply off for a predetermined time period when the number of waveform modifications counted at that load reaches a predetermined number.

4. A method as claimed in claim 1 wherein at each individual load the supply is controlled by switching the supply off for a predetermined time period when the selected signal is received.

5. A method as claimed in claim 3 wherein the counting is reset during or at the end of said predetermined time period.

6. A method of controlling individual loads within the premises of consumers on an alternating electrical power supply comprising the steps of monitoring the overall demand on the power supply, modifying the alternating waveform of the power supply by open-circuit switching of the power supply of duration less than one cycle of the supply frequency to provide a signal representative of the overall demand when the overall demand exceeds a predetermined limit, and at each load, detecting said signal, incrementing the count on a counter on detection of said signal when the associated individual load is taking current, decrementing the count on the counter in the absence of a further signal after a predetermined time, and switching off the individual load, or a part thereof, when the count in the counter exceeds a predetermined value.

7. A method as claimed in claim 6 wherein the counter is decremented only when the overall demand is below said predetermined limited by a predetermined magnitude.

8. A method as claimed in claim 6 wherein said signal is representative of the demand and wherein, at an individual load, decrementing of the counter is effected when the demand is less than said predetermined limit by a predetermined amount.

9. A method as claimed in claim 6 wherein the duration of the open-circuit switching is substantially less than a cycle of the alternating electric power supply, the duration being a measure of the magnitude of the demand.

10. A method as claimed in claim 9 wherein the open-circuit switching is effected by switching off the power supply, using a solid state switch, immediately before the zero crossing of the voltage waveform or current waveform and switching the power supply on again on a short time later, the duration of the interruption being small compared with the time duration of a cycle of the waveform.

11. Apparatus for controlling loads within the premises of consumers on an alternating electrical power supply comprising, at each individual load to be controlled, means for detecting one out of a plurality of different signals broadcast over the power supply network within the premises of the associated consumer as distinguishable modifications of the power supply waveform, and switching means responsive to the detected signal for interrupting the power supply to the load, each of said different signals comprising at least one interruption of the power supply waveform for a time period of less than one cycle of the waveform.

12. Apparatus as claimed in claim 11 wherein said means for detecting one out of a plurality of different signals comprises means for detecting and counting the number of signals received as detectable modifications of the power supply waveform and wherein the switching means interrupts the power supply to the load in accordance with the magnitude of the count.

13. Apparatus as claimed in claim 12 wherein the means interrupting the power supply to the load comprises means comparing the counted number of received signals with a predetermined number and operative to switch off the supply to the load when the counted number equals said predetermined number.

14. Apparatus as claimed in claim 13 wherein the means interrupting the power supply to the load interrupts the power supply to the load for a predetermined time period and resets the counting means during or at the end of said predetermined time period.

15. An electricity supply system comprising an alternating electrical power supply generating means, signalling means arranged to interrupt the power supply waveform of said generating means for a short duration in selected cycles of the alternating waveform, the duration being small compared with the time duration of one cycle at the power supply frequency, a plurality of loads within the premises of individual consumers, means feeding the power supply with interrupted waveform to said loads, and at each load, means for detecting and counting the number of interruptions in the received power supply waveform in a predetermined time period, and means responsive to the counting of a predetermined number of interruptions for switching the power supply to said load.

16. Apparatus for use by a consumer for controlling individual loads within the premises of the consumer on an alternating electrical power supply comprising means for monitoring the overall demand placed on the power supply by the consumer, means for modifying the alternating power supply waveform by interrupting the power supply for a short duration less than one cycle of the supply frequency to provide a signal representative of the overall demand on the power supply by the consumer when such demand exceeds a predetermined limit, and associated with the individual supply circuit to each load to be controlled, data processing means including means for detecting said signal, a counter, means operative in response to said signal to increment the count on said counter when the associated load is taking current, means operative to decrement the count on the counter in the absence of a further signal after a predetermined time, and switch means operative to switch off the individual load, or a part thereof, when the count in the counter exceeds a predetermined value.

17. Apparatus as claimed in claim 16 wherein different loads of a consumer are arranged to be switched off at different count numbers.

18. Apparatus for use by a consumer for controlling loads within the premises of the consumer on an alternating current power supply, to maintain the overall demand placed on the power supply by the consumer at or below a predetermined maximum demand, comprising means for sensing the overall demand placed on the power supply by the consumer and for determining when the sensed demand exceeds said maximum demand, means for applying a signal to the various loads by modifying the waveform of the power supply by interrupting the power supply for a short duration less than one cycle of the supply frequency when said maximum demand is exceeded and associated with or at each individual load on the various loads to be controlled, means for detecting said signals, a counter with circuit means for incrementing the count of the counter each time a signal is received and for decrementing the count of the counter in the absence of a signal for a predetermined time, switch means operative to interrupt the power supply to the individual load, or part thereof, when the count in the associated counter exceeds a predetermined magnitude, the predetermined magnitudes being different for a least some of the different individual loads, and means for operating the switch to restore the power supply to the individual load when the count is below the predetermined number for the individual load.

19. Apparatus as claimed in claim 16 wherein the switch means comprises a solid state switch at each individual load.

20. Apparatus as claimed in claim 16 wherein the means for modifying the power supply waveform to provide a signal comprises a solid state switching device to effect an interruption of the power supply for a time period small compared with the time duration of a cycle of the alternating power supply and logic means for controlling the solid state switching device in accordance with the monitored demand.

21. Apparatus as claimed in claim 20 wherein said monitoring means comprises a current transformer giving an output signal representative of the total demand current on the power supply, and analogue-to-digital conversion means to convert the output signal into a digital signal and wherein said logic means are arranged to compare the digital signal with a preset maximum demand magnitude and to operate the switching means in accordance with said comparison.

22. A method of controlling loads within the premises of consumers on an electrical power supply comprising the steps of modifying the voltage by short duration interruptions of duration less than one cycle of the supply frequency to provide detectable control signals of a plurality of distinguishably different forms and, at each individual load to be controlled, detecting the control signals, selecting one of the detected signals, and controlling the load in accordance with the selected signal.

23. A method as claimed in claim 22 wherein the distinguishable signals comprise distinguishably different numbers of interruptions within a predetermined time period.

24. Apparatus for controlling loads on an electrical power supply comprising means for modifying the voltage by pulse interruptions of duration less than one cycle of the supply frequency to provide detectable control signals of a plurality of distinguishably different forms and at each individual load to be controlled means for detecting the control signals, means for selecting one of the detected signals, and means for controlling the load in accordance with the selected signal.

25. A method as claimed in claim 1 wherein the steps of monitoring and opening are performed at each consumers' premises.

26. A method as claimed in claim 6 wherein the steps of monitoring and modifying are performed at each consumers' premises.

27. Apparatus as claimed in claim 11 further comprising means for monitoring the power demand on the electrical power supply and means for broadcasting over the power supply network a signal indicative of the monitored demand.

28. Apparatus as claimed in claim 27 wherein said monitoring means and said broadcasting means are within the premises of the associated consumer.

29. A system as claimed in claim 15 wherein said signalling means is within the premises of the individual consumers.

30. Apparatus as claimed in claim 16 wherein said monitoring means and said modifying means are within the premises of the consumer.

31. Apparatus as claimed in claim 18 wherein said sensing and determining means and said applying means are within the premises of the consumer.

32. A method as claimed in claim 22 wherein the step of modifying is performed at each consumers' premises.

33. Apparatus as claimed in claim 24 wherein said modifying means is within the premises of the consumer.

* * * * *